(12) United States Patent
Okura et al.

(10) Patent No.: US 11,487,817 B2
(45) Date of Patent: Nov. 1, 2022

(54) INDEX GENERATION METHOD, DATA RETRIEVAL METHOD, APPARATUS OF INDEX GENERATION

(71) Applicant: FUJITSU LIMITED, Kawasaki (JP)

(72) Inventors: Seiji Okura, Meguro (JP); Masahiro Kataoka, Kamakura (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/563,932

(22) Filed: Sep. 9, 2019

(65) Prior Publication Data

US 2020/0004784 A1 Jan. 2, 2020

Related U.S. Application Data

(63) Continuation of application No. PCT/JP2018/001971, filed on Jan. 23, 2018.

(30) Foreign Application Priority Data

Mar. 28, 2017 (JP) .............................. JP2017-062519

(51) Int. Cl.
*G06F 16/901* (2019.01)
*G06F 16/93* (2019.01)
(Continued)

(52) U.S. Cl.
CPC ...... *G06F 16/901* (2019.01); *G06F 16/90344* (2019.01); *G06F 16/93* (2019.01); *G06F 40/30* (2020.01)

(58) Field of Classification Search
CPC .. G06F 16/901; G06F 16/93; G06F 16/90344; G06F 40/30
See application file for complete search history.

(56) References Cited

U.S. PATENT DOCUMENTS 5,268,840 A * 12/1993 Chang .................... G06F 40/53
704/9
5,724,594 A * 3/1998 Pentheroudakis .... G06F 40/247
704/10
(Continued)

FOREIGN PATENT DOCUMENTS

JP  2004-206473 A  7/2004
JP  2009-48351 A  3/2009
(Continued)

OTHER PUBLICATIONS

International Search Report and Written Opinion dated May 1, 2018 for PCT/JP2018/001971 filed on Jan. 23, 2018, 6 pages including English Translation of the International Search Report.

*Primary Examiner* — Alford W Kindred
*Assistant Examiner* — Tiffany Thuy Bui
(74) *Attorney, Agent, or Firm* — Xsensus LLP

(57) ABSTRACT

An index generation method includes: executing an extraction process that includes extracting a plurality of morphemes from document information; and executing a generation process that includes generating index information with respect to each of the plurality of morphemes, wherein the index information includes a first logical value and a second logical value, wherein the first logical value indicates existence of a first morpheme associated with 'morpheme information indicating the first morpheme' and 'position information indicating a position of the first morpheme in the document information', and wherein the second logical value indicates existence of the first morpheme associated with 'attribute information indicating a semantic attribute of the first morpheme' and 'position information indicating the position of the first morpheme'.

7 Claims, 25 Drawing Sheets

(51) Int. Cl.
*G06F 16/903* (2019.01)
*G06F 40/30* (2020.01)

(56) References Cited

U.S. PATENT DOCUMENTS

| | | | | |
|---|---|---|---|---|
| 5,848,385 | A * | 12/1998 | Poznanski | G06F 40/284 704/4 |
| 6,070,134 | A * | 5/2000 | Richardson | G06F 16/367 704/9 |
| 6,161,084 | A * | 12/2000 | Messerly | G06F 40/284 704/9 |
| 10,394,860 | B1 * | 8/2019 | Zelenov | G06F 16/951 |
| 2005/0203900 | A1 * | 9/2005 | Nakamura | G06F 16/334 |
| 2006/0206463 | A1 * | 9/2006 | Takachio | G06F 16/3329 |
| 2009/0248671 | A1 * | 10/2009 | Maruyama | G06F 16/353 |
| 2015/0112683 | A1 * | 4/2015 | Fujii | G10L 15/1822 704/254 |
| 2016/0140217 | A1 | 5/2016 | Sano et al. | |
| 2016/0217207 | A1 | 7/2016 | Okura et al. | |
| 2017/0300507 | A1 | 10/2017 | Kataoka et al. | |

FOREIGN PATENT DOCUMENTS

| | | |
|---|---|---|
| JP | 2010-198425 A | 9/2010 |
| JP | 2015-005027 A | 1/2015 |
| JP | 2016-134037 A | 7/2016 |
| JP | 2017-194762 A | 10/2017 |

\* cited by examiner

FIG. 6

| MORPHEME/ATTRIBUTE INFORMATION | OFFSET | | | | | | | | | | | |
|---|---|---|---|---|---|---|---|---|---|---|---|---|
| | DOCUMENT 1 | | | | DOCUMENT 2 | | | DOCUMENT 3 | | | | |
| | 0 | 1 | 2 | 3 | 0 | 1 | 2 | 0 | 1 | 2 | 3 | 4 | ... |
| KE-KI | 1 | 0 | 0 | 0 | 1 | 0 | 2 | 0 | 1 | 0 | 0 | 0 | |
| REIZOUKO | 0 | 1 | 0 | 0 | 0 | 1 | 0 | 1 | 0 | 0 | 0 | 0 | |
| SOTO | 0 | 0 | 1 | 0 | 0 | 0 | 0 | 0 | 0 | 0 | 0 | 0 | |
| ARU | 0 | 0 | 0 | 1 | 0 | 0 | 1 | 0 | 0 | 0 | 0 | 1 | |
| KURI-MU | 0 | 0 | 0 | 0 | 0 | 0 | 0 | 0 | 0 | 1 | 0 | 0 | |
| OITE | 0 | 0 | 0 | 0 | 0 | 0 | 0 | 0 | 0 | 0 | 1 | 0 | |
| ... | | | | | | | | | | | | | |
| PARTICLE : GA | 1 | 0 | 0 | 0 | 0 | 0 | 0 | 0 | 0 | 1 | 0 | 0 | |
| PARTICLE : NO | 0 | 1 | 0 | 0 | 0 | 0 | 0 | 1 | 0 | 0 | 0 | 0 | |
| PARTICLE : NI | 0 | 0 | 1 | 0 | 0 | 1 | 0 | 0 | 1 | 0 | 0 | 0 | |
| PARTICLE : HA | 0 | 0 | 0 | 0 | 1 | 0 | 0 | 0 | 0 | 0 | 0 | 0 | |
| PARTICLE : MO | 0 | 0 | 0 | 0 | 0 | 0 | 0 | 0 | 0 | 0 | 0 | 0 | |
| PARTICLE : ... | 0 | 0 | 0 | 0 | 0 | 0 | 0 | 0 | 0 | 0 | 0 | 0 | |

| MORPHEME/ ATTRIBUTE INFORMATION | OFFSET | | | | | | | | | | | |
|---|---|---|---|---|---|---|---|---|---|---|---|---|
| | DOCUMENT 1 | | | | DOCUMENT 2 | | | DOCUMENT 3 | | | | |
| | 0 | 1 | 2 | 3 | 0 | 1 | 2 | 0 | 1 | 2 | 3 | 4 | ... |
| PARTICLE : GA | 1 | 0 | 0 | 0 | 0 | 0 | 0 | 0 | 0 | 1 | 0 | 0 | |
| PARTICLE : HA | 0 | 0 | 0 | 0 | 1 | 0 | 0 | 0 | 0 | 0 | 0 | 0 | |
| PARTICLE : MO | 0 | 0 | 0 | 0 | 0 | 0 | 0 | 0 | 0 | 0 | 0 | 0 | |

OR OPERATION

| MORPHEME/ ATTRIBUTE INFORMATION | OFFSET | | | | | | | | | | | |
|---|---|---|---|---|---|---|---|---|---|---|---|---|
| | DOCUMENT 1 | | | | DOCUMENT 2 | | | DOCUMENT 3 | | | | |
| | 0 | 1 | 2 | 3 | 0 | 1 | 2 | 0 | 1 | 2 | 3 | 4 | ... |
| 1101 ~ PARTICLE: GA, HA, OR MO | 1 | 0 | 0 | 0 | 1 | 0 | 0 | 0 | 0 | 1 | 0 | 0 | |

| MORPHEME/ATTRIBUTE INFORMATION | OFFSET | | | | | | | | | | | |
|---|---|---|---|---|---|---|---|---|---|---|---|---|
| | DOCUMENT 1 | | | | DOCUMENT 2 | | | DOCUMENT 3 | | | | |
| | 0 | 1 | 2 | 3 | 0 | 1 | 2 | 0 | 1 | 2 | 3 | 4 | ... |
| 1201 KE-KI | 1 | 0 | 0 | 0 | 1 | 0 | 0 | 0 | 1 | 0 | 0 | 0 | |
| 1101 PARTICLE : GA OR HA OR MO | 1 | 0 | 0 | 0 | 1 | 0 | 0 | 0 | 0 | 1 | 0 | 0 | |

AND OPERATION

| MORPHEME/ATTRIBUTE INFORMATION | OFFSET | | | | | | | | | | | |
|---|---|---|---|---|---|---|---|---|---|---|---|---|
| | DOCUMENT 1 | | | | DOCUMENT 2 | | | DOCUMENT 3 | | | | |
| | 0 | 1 | 2 | 3 | 0 | 1 | 2 | 0 | 1 | 2 | 3 | 4 | ... |
| 1202 AND OPERATION RESULT | 1 | 0 | 0 | 0 | 1 | 0 | 0 | 0 | 0 | 0 | 0 | 0 | |

| MORPHEME/ATTRIBUTE INFORMATION | OFFSET | | | | | | | | | | | |
|---|---|---|---|---|---|---|---|---|---|---|---|---|
| | DOCUMENT 1 | | | | DOCUMENT 2 | | | DOCUMENT 3 | | | | |
| | 0 | 1 | 2 | 3 | 0 | 1 | 2 | 0 | 1 | 2 | 3 | 4 | ... |
| 1301 REIZOUKO | 0 | 1 | 0 | 0 | 0 | 1 | 0 | 1 | 0 | 0 | 0 | 0 | |
| 1302 PARTICLE : NI | 0 | 0 | 1 | 0 | 0 | 1 | 0 | 0 | 1 | 0 | 0 | 0 | |

AND OPERATION

| MORPHEME/ATTRIBUTE INFORMATION | OFFSET | | | | | | | | | | | |
|---|---|---|---|---|---|---|---|---|---|---|---|---|
| | DOCUMENT 1 | | | | DOCUMENT 2 | | | DOCUMENT 3 | | | | |
| | 0 | 1 | 2 | 3 | 0 | 1 | 2 | 0 | 1 | 2 | 3 | 4 | ... |
| 1303 AND OPERATION RESULT | 0 | 0 | 0 | 0 | 0 | 1 | 0 | 0 | 0 | 0 | 0 | 0 | |

FIG. 14

| MORPHEME/ATTRIBUTE INFORMATION | OFFSET | | | | | | | | | | | |
|---|---|---|---|---|---|---|---|---|---|---|---|---|
| | DOCUMENT 1 | | | | DOCUMENT 2 | | | DOCUMENT 3 | | | | |
| | 0 | 1 | 2 | 3 | 0 | 1 | 2 | 0 | 1 | 2 | 3 | 4 | ... |
| 1401 ARU | 0 | 0 | 0 | 1 | 0 | 0 | 1 | 0 | 0 | 0 | 1 | 0 | |

| | MORPHEME/<br>ATTRIBUTE INFORMATION | DOCUMENT 1 | DOCUMENT 2 | DOCUMENT 3 | |
|---|---|---|---|---|---|
| 1501 | KE-KI AND PARTICLE OF KE-KI =<br>(GA, HA, or MO) | 1 | 1 | 0 | ... |
| 1502 | REIZOUKO AND PARTICLE OF<br>REIZOUKO = (NI) | 0 | 1 | 0 | ... |
| 1503 | ARU | 1 | 1 | 1 | ... |

AND OPERATION

| | MORPHEME/<br>ATTRIBUTE INFORMATION | DOCUMENT 1 | DOCUMENT 2 | DOCUMENT 3 | |
|---|---|---|---|---|---|
| 1504 | AND OPERATION RESULT | 0 | 1 | 0 | ... |

FIG. 17

| MORPHEME/ ATTRIBUTE INFORMATION | OFFSET | | | | | | |
|---|---|---|---|---|---|---|---|
| | 0 | 1 | 2 | 3 | 4 | 5 | ... |
| KARE | 1 | 0 | 0 | 0 | 0 | 0 | |
| SUKI | 0 | 1 | 0 | 0 | 0 | 0 | |
| KE-KI | 0 | 0 | 1 | 0 | 0 | 0 | |
| ... | | | | | | | |
| OBJ MODIFIER | 0 | 1 | 0 | 0 | 0 | 0 | |
| OBJ HEAD | 0 | 0 | 1 | 0 | 0 | 0 | |
| AGENT MODIFIER | 0 | 1 | 0 | 0 | 0 | 0 | |
| AGENT HEAD | 1 | 0 | 0 | 0 | 0 | 0 | |
| ... | 0 | 0 | 0 | 0 | 0 | 0 | |

| | MORPHEME/<br>ATTRIBUTE INFORMATION | OFFSET | | | | | | |
|---|---|---|---|---|---|---|---|---|
| | | 0 | 1 | 2 | 3 | 4 | 5 | ... |
| 2101 | KARE | 1 | 0 | 0 | 0 | 0 | 0 | |
| 2102 | AGENT MODIFIER | 1 | 0 | 0 | 0 | 0 | 0 | |

AND OPERATION

| | | | | | | | | |
|---|---|---|---|---|---|---|---|---|
| 2103 | AND OPERATION RESULT | 1 | 0 | 0 | 0 | 0 | 0 | |

| | MORPHEME/<br>ATTRIBUTE INFORMATION | OFFSET | | | | | | |
|---|---|---|---|---|---|---|---|---|
| | | 0 | 1 | 2 | 3 | 4 | 5 | ... |
| 2201 | KE-KI | 0 | 0 | 1 | 0 | 0 | 0 | |
| 2202 | OBJ HEAD | 0 | 0 | 1 | 0 | 0 | 0 | |

AND OPERATION

| 2203 | AND OPERATION RESULT | 0 | 0 | 1 | 0 | 0 | 0 | |
|---|---|---|---|---|---|---|---|---|

FIG. 24

| MORPHEME/<br>ATTRIBUTE INFORMATION | DOCUMENT<br>11 | DOCUMENT<br>12 | DOCUMENT<br>13 | |
|---|---|---|---|---|
| 2401 ~ "KARE" AND "ATTRIBUTE OF KARE = (HEAD OF AGENT)" | 1 | 0 | 0 | ... |
| 2402 ~ "KE-KI" AND "ATTRIBUTE OF KE-KI = (MODIFIER OF OBJ)" | 1 | 0 | 0 | ... |
| 2403 ~ "SUKI" AND "ATTRIBUTE OF SUKI = (MODIFIER OF OBJ)" AND "ATTRIBUTE OF SUKI = (MODIFIER OF AGENT)" | 1 | 0 | 1 | ... |

AND OPERATION

| MORPHEME/<br>ATTRIBUTE INFORMATION | DOCUMENT<br>11 | DOCUMENT<br>12 | DOCUMENT<br>13 | |
|---|---|---|---|---|
| 2404 ~ AND OPERATION RESULT | 1 | 0 | 0 | ... |

INDEX GENERATION METHOD, DATA RETRIEVAL METHOD, APPARATUS OF INDEX GENERATION

CROSS-REFERENCE TO RELATED APPLICATIONS

This application is a continuation application of International Application PCT/JP2018/001971 filed on Jan. 23, 2018 and designated the U.S., the entire contents of which are incorporated herein by reference. The International Application PCT/JP2018/001971 is based upon and claims the benefit of priority of the prior Japanese Patent Application No. 2017-062519, filed on Mar. 28, 2017, the entire contents of each are incorporated herein by reference.

FIELD

The embodiment discussed herein is related to an index generation method, a data retrieval method, and an apparatus of index generation.

BACKGROUND

In recent years, the volume of text data has significantly increased, and the importance of text retrieval is growing. In particular, for example, research on semantic processing for secretarial function application software or the like is becoming active, and retrieval for a sentence or document having a meaning similar to a search string matters more than ever.

A lexical analysis, a morphological analysis, a semantic analysis, and the like are used for an analysis on natural sentences used in text retrieval. The lexical analysis is processing for splitting a string into words. The morphological analysis is processing for breaking down a string into morphemes and assigning information such as categories or attributes to the respective morphemes. The morphemes obtained by the morphological analysis may be treated as words in some cases.

The semantic analysis is processing for obtaining a semantic structure of a natural sentence by using a morphological analysis result of the natural sentence. When the semantic structure corresponding to the semantic analysis result is used, what the natural sentence means may be represented as data to be dealt by a computer.

The semantic structure includes a plurality of semantic symbols respectively representing meanings of a plurality of words included in the morphological analysis result and information representing a connection relationship between two semantic symbols. A single semantic symbol may correspond to a plurality of words. The semantic structure may be represented, for example, by a directed graph constituted by a plurality of nodes representing a plurality of semantic symbols and an arc representing a connection relationship between two nodes. A smallest substructure of the semantic structure is called a minimal meaningful unit and constituted by two nodes and an arc between those nodes.

Examples of the related art include Japanese Laid-open Patent Publication No. 2004-206473, Japanese Laid-open Patent Publication No. 2015-5027, and Japanese Laid-open Patent Publication No. 2016-134037.

SUMMARY

According to an aspect of the embodiments, an index generation method includes: executing an extraction process that includes extracting a plurality of morphemes from document information; and executing a generation process that includes generating index information with respect to each of the plurality of morphemes, wherein the index information includes a first logical value and a second logical value, wherein the first logical value indicates existence of a first morpheme associated with 'morpheme information indicating the first morpheme' and 'position information indicating a position of the first morpheme in the document information', and wherein the second logical value indicates existence of the first morpheme associated with 'attribute information indicating a semantic attribute of the first morpheme' and 'position information indicating the position of the first morpheme'.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating index information including attribute information indicating a particle;
FIG. 14 is a diagram illustrating a bit string of 'aru';
FIG. 17 is a diagram illustrating index information including attribute information indicating a dependency relationship;
FIG. 24 is a diagram illustrating a seventh AND operation.

DESCRIPTION OF EMBODIMENTS

In similar document retrieval for retrieving a sentence or document having a meaning similar to a search string, a semantic structure of the search string is desirably compared with a semantic structure of a retrieval target document. However, since a semantic analysis result of the retrieval target document includes a large number of directed graphs representing the semantic structure, processing time for comparing those directed graphs with directed graphs representing the semantic structure of the search string increases.

To increase the speed of text retrieval, indices where appearance positions of words included in the document are registered may be used in some cases. However, in a case where the semantic structure of the document including N words is registered in indices, since the size of indices increases in the order of N×N, it is not realistic to register the semantic structure itself in the indices.

An aspect of an embodiment aims at providing index information with which retrieval processing including a meaning of a morpheme included in a search string may be performed.

Hereinafter, an embodiment will be described in detail with reference to the drawings.

Figure 1:
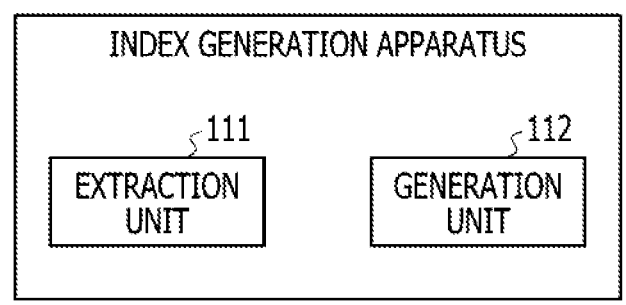
FIG. 1 is a functional configuration diagram of an index generation apparatus.

FIG. 1 illustrates a functional configuration example of an index generation apparatus according to the embodiment. An index generation apparatus 101 includes an extraction unit 111 and a generation unit 112. The extraction unit 111 and the generation unit 112 perform index generation processing to generate index information.

Figure 2:
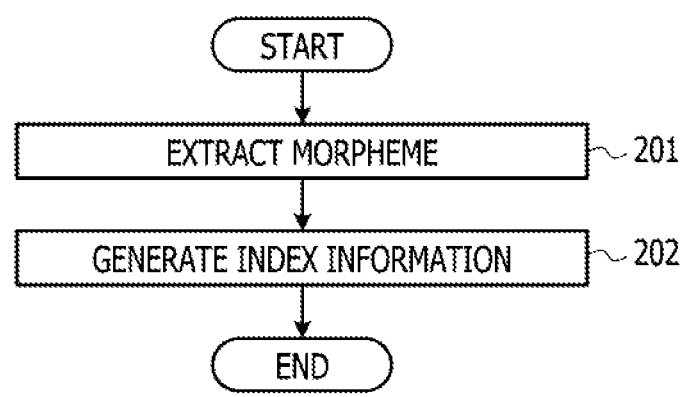
FIG. 2 is a flowchart of index generation processing.

FIG. 2 is a flowchart illustrating an example of the index generation processing performed by the index generation apparatus 101 in FIG. 1. First, the extraction unit 111 extracts a plurality of morphemes from document information (step 201).

Next, the generation unit 112 generates index information including a first logical value and a second logical value regarding each of the plurality of extracted morphemes (step 202). The first logical value is a logical value indicating the existence of a morpheme associated with morpheme information indicating the morpheme and position information indicating a position of the morpheme in the document information. The second logical value is a logical value indicating the existence of the morpheme associated with attribute information indicating a semantic attribute of the morpheme and the position information indicating the position of the morpheme.

With the index generation apparatus 101 in FIG. 1, the index information may be provided with which the retrieval processing including the meaning of the morpheme included in the search string may be performed.

Figure 3:
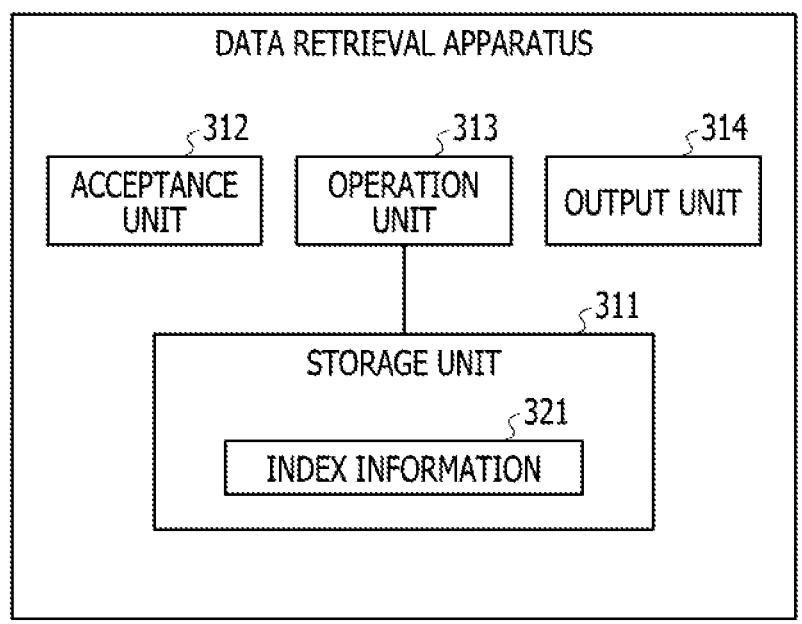
FIG. 3 is a functional configuration diagram of a data retrieval apparatus.

FIG. 3 illustrates a functional configuration example of a data retrieval apparatus according to the embodiment. A data retrieval apparatus 301 includes a storage unit 311, an acceptance unit 312, an operation unit 313, and an output unit 314. The storage unit 311 stores index information 321 generated by in the index generation apparatus 101 in FIG. 1. The acceptance unit 312, the operation unit 313, and the output unit 314 perform data retrieval processing based on the index information 321.

Figure 4:
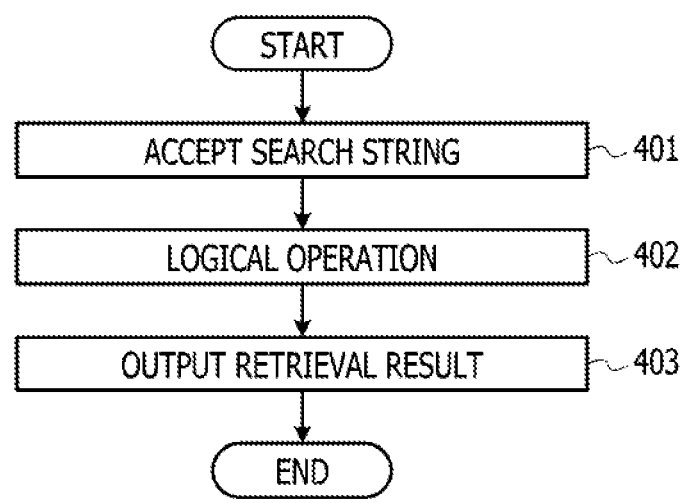
FIG. 4 is a flowchart of data retrieval processing.

FIG. 4 is a flowchart illustrating an example of the data retrieval processing performed by the data retrieval apparatus 301 in FIG. 3. First, the acceptance unit 312 accepts the search string with respect to the document information (step 401).

Next, the operation unit 313 refers to the index information 321 and performs a logical operation by using a third logical value and a fourth logical value (step 402). The third logical value is a logical value associated with a retrieval morpheme included in the search string in the index information 321, and the fourth logical value is a logical value associated with a semantic attribute of the retrieval morpheme.

Next, the output unit 314 outputs a retrieval result of the search string based on the result of the logical operation (step 403).

With the data retrieval apparatus 301 in FIG. 3, the retrieval processing including the meaning of the morpheme included in the search string may be performed.

Figure 5:
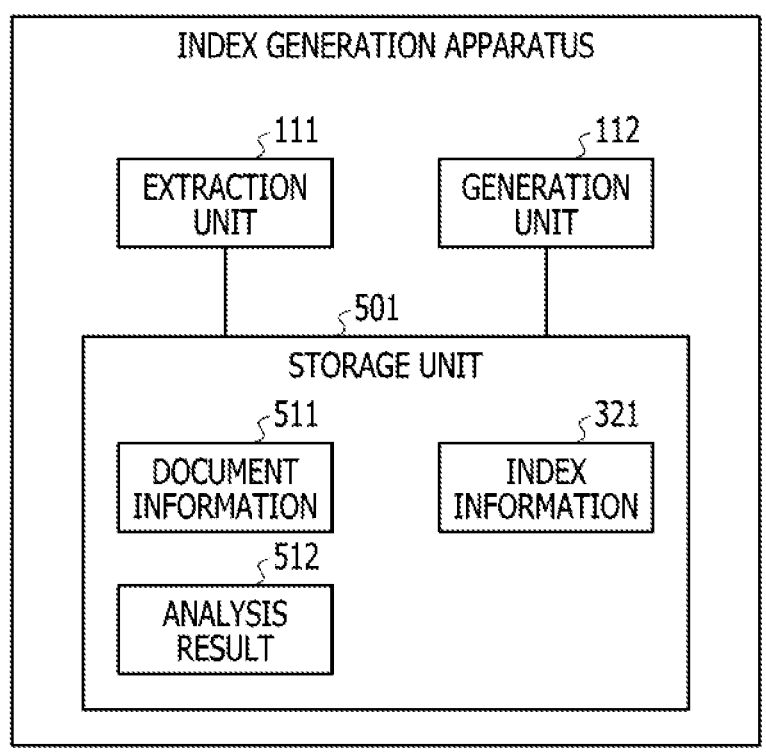
FIG. 5 is a functional configuration diagram illustrating a specific example of the index generation apparatus.

FIG. 5 illustrates a specific example of the index generation apparatus 101 in FIG. 1. The index generation apparatus 101 in FIG. 5 includes the extraction unit 111, the generation unit 112, and a storage unit 501. The storage unit 501 stores document information 511. The document information 511 may be a document written in a natural language such as Japanese, Chinese, Korean, English, or French and may also include a plurality of documents.

The extraction unit 111 performs the morphological analysis on the document information 511 to extract morphemes included in each document of the document information 511, generates an analysis result 512 indicating an appearance position of each of the extracted morphemes, and stores the analysis result 512 in the storage unit 501.

The analysis result 512 includes identification information (morpheme ID) of the morpheme, attribute information indicating a semantic attribute of the morpheme, and position information indicating the appearance position of the morpheme in the document information 511. The morpheme ID is an example of morpheme information indicating the morpheme and may be a compression code used when the document information 511 is compressed. The semantic attribute of the morpheme represents a semantic relationship between the morpheme and another morpheme in the document information 511.

The generation unit 112 generates the index information 321 by using the analysis result 512 and stores the index information 321 in the storage unit 501.

The following pieces of information are used as the attribute information of the morpheme, for example:

(a) Morpheme ID indicating a third morpheme that exists before or after a first morpheme in the document information 511 and represents a semantic relationship between the first morpheme and a second morpheme; and (b) Information indicating a dependency relationship between the first morpheme and the second morpheme in the semantic structure of the document information 511 and information indicating whether the first morpheme is a modifier or a head.

In a case where the document information 511 is a Japanese document, for example, the morpheme ID indicating a particle immediately following a noun may be used as the attribute information of the above-mentioned (a) in the analysis result 512. Since the particle represents a semantic role of the precedent noun to some extent, semantically narrowing-down retrieval may be performed by using information of the particle.

A case where the similar document retrieval is performed with respect to the document information 511 including the following documents 1 to 3 by using a search string 'Ke-ki ga reizouko ni aru (which means that a cake exists in the refrigerator).' will be described.

Document 1: Ke-ki ga reizouko no soto ni aru (which means that a cake exists outside the refrigerator).

Document 2: Ke-ki ha reizouko ni aru (which means that a cake exists in the refrigerator).

Document 3: Reizouko no ke-ki ni kuri-mu ga oite aru (which means that cream is placed over the cake in the refrigerator).

In this case, the search string is broken into five morphemes including 'ke-ki (which means cake)', 'ga', 'reizouko (which means refrigerator)', 'ni', and 'aru (which means exists)'. 'Ke-ki' and 'reizouko' are nouns, 'ga' and 'ni' are particles, and 'aru' is a verb.

A search key "'ke-ki' AND 'reizouko' AND 'aru'" may be generated by using three morphemes including 'ke-ki', 'reizouko', and 'aru' among them. This search key indicates that the document includes 'ke-ki', 'reizouko', and 'aru'. When the retrieval is performed with respect to the document information 511 by using this search key, the retrieval results include all of the documents 1 to 3. However, the document 1 means that a cake does not exist in the refrigerator and is not appropriate as the retrieval result.

In view of the above, it is considered to narrow down the retrieval results by including not only nouns but also particles immediately following the nouns in the search key. In the search string, the particle following 'ke-ki' is 'ga', and the particle following 'reizouko' is 'ni'. In this case, the following search key may be generated.

Search key: 'ke-ki' AND 'reizouko' AND 'aru' AND 'particle of ke-ki=('ga' or 'ha' or 'mo')' AND 'particle of reizouko=(ni)'

'Particle of ke-ki=('ga' or 'ha' or 'mo')' indicates that the particle following 'ke-ki' in the document is 'ga', 'ha', or 'mo'. 'Particle of reizouko=(ni)' indicates that the particle following 'reizouko' in the document is 'ni'. When the retrieval with respect to the document information 511 is performed by using this search key, only the document 2 is included in the retrieval result, and the document 1 and the document 3 are excluded from the retrieval result.

When the information on the particle immediately following the noun is added to the search key as described above to perform the retrieval with respect to the document information 511, it is possible to appropriately narrow down the retrieval results.

FIG. 6 illustrates an example of the index information 321 including attribute information indicating a particle. The index information 321 in FIG. 6 is generated from the document information 511 of a plurality of documents including the documents 1 to 3. The morpheme/attribute information represents the morpheme ID of the morpheme other than the particle and the morpheme ID of the particle included in the plurality of documents. For example, 'ke-ki', 'reizouko', 'soto (which means outside)', 'aru', 'kuri-mu (which means cream)', and 'oite (which means being placed)' are morphemes other than the particle, and 'ga', 'no', 'ni', 'ha', and 'mo' are particles. The morpheme ID of the particle is an example of the attribute information.

An offset represents an appearance position of each morpheme in the document information 511. In this example, the offset includes a document ID indicating a document and a number indicating an appearance position of the morpheme in the document. For example, appearance positions in the document 1 are represented by four numbers including "0" to "3", appearance positions in the document 2 are represented by three numbers including "0" to "2", and appearance positions in the document 3 are represented by five numbers including "0" to "4".

In a case where the particle immediately following the noun exists, those two morphemes are treated to appear at the same position, and positions of the two morphemes in the document are represented by the same number. For example, in the case of the document 1, the appearance position of 'ke-ki' and 'ga' is represented by the number "0", the appearance position of 'reizouko' and 'no' is represented by the number "1", and the appearance position of 'soto' and 'ni' is represented by the number "2". The appearance position of 'aru' is represented by the number "3".

The index information 321 in FIG. 6 includes a bit string corresponding to the morpheme other than the particle and a bit string corresponding to the particle. A logical value (bit value) "1" of the bit string corresponding to the morpheme other than the particle indicates that the morpheme exists, and a logical value "0" indicates that the morpheme does not exist.

For example, in the bit string corresponding to 'ke-ki', the logical value "1" stored in the position represented by the number "0" in the document 1 indicates that 'ke-ki' appears at the position represented by the number "0" in the document 1. In the bit string corresponding to 'reizouko', the logical value "1" stored in the position represented by the number "1" in the document 1 indicates that 'reizouko' appears at the position represented by the number "1" in the document 1.

The logical value "1" of the bit string corresponding to the particle indicates that a combination of the noun and the following particle exists, and the logical value "0" indicates that the combination does not exist.

For example, in the bit string corresponding to 'ga', the logical value "1" stored in the position represented by the number "0" in the document 1 indicates that the combination of the noun and 'ga' appears at the position represented by the number "0" in the document 1. In the bit string corresponding to 'no', the logical value "1" stored in the position represented by the number "1" in the document 1 indicates that the combination of the noun and 'no' appears at the position represented by the number "1" in the document 1.

Figure 7:
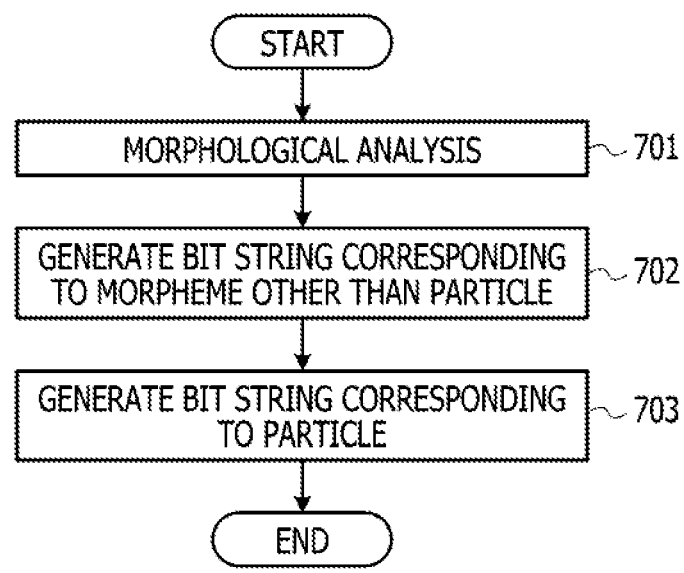
FIG. 7 is a flowchart illustrating a first specific example of the index generation processing.

FIG. 7 is a flowchart illustrating a first specific example of the index generation processing performed by the index generation apparatus 101 in FIG. 5. First, the extraction unit 111 performs the morphological analysis on the document information 511 to extract the morphemes from the document information 511 and generate the analysis result 512 (step 701).

Next, the generation unit 112 generates the bit string corresponding to each morpheme other than the particle based on the analysis result 512 (step 702). At this time, the generation unit 112 writes the logical value "1" in one or more positions corresponding to the appearance position of the morpheme and writes the logical value "0" in the other positions in the bit string corresponding to each morpheme.

Next, the generation unit 112 generates the bit string corresponding to each particle based on the analysis result 512 (step 703). At this time, the generation unit 112 writes the logical value "1" in one or more positions corresponding to the appearance position of the particle and writes the logical value "0" in the other positions in the bit string corresponding to each particle.

Figure 8:
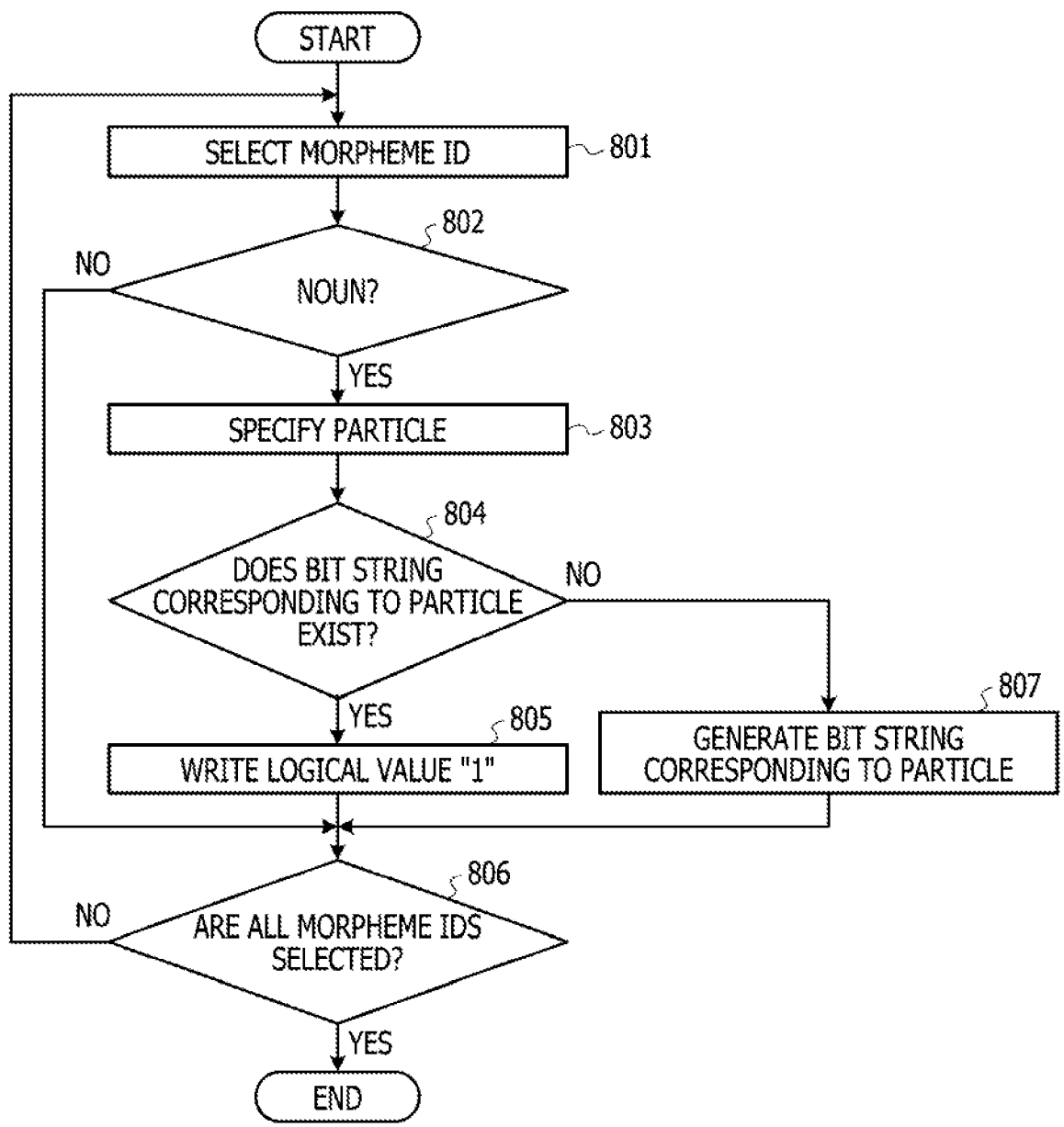
FIG. 8 is a flowchart illustrating first bit string generation processing.

FIG. 8 is a flowchart illustrating an example of first bit string generation processing in step 703 in FIG. 7. First, the generation unit 112 selects one morpheme ID from the plurality of morpheme IDs included in the analysis result 512 (step 801) and checks whether or not the morpheme indicated by the morpheme ID is a noun (step 802).

In a case where the morpheme indicated by the morpheme ID is a noun (step 802, YES), the generation unit 112 specifies a particle following the noun (step 803) and checks whether or not the bit string corresponding to the specified particle exists in the index information 321 (step 804).

In a case where the bit string corresponding to the particle exists (step 804, YES), the generation unit 112 writes the logical value "1" in the position corresponding to the appearance position of the particle in the bit string (step 805). On the other hand, in a case where the bit string corresponding to the particle does not exist (step 804, NO), the generation unit 112 generates the bit string corresponding to the particle (step 807).

Next, the generation unit 112 checks whether or not all the morpheme IDs included in the analysis result 512 are selected (step 806). In a case where the unselected morpheme ID remains (step 806, NO), the generation unit 112 repeats the processing in step 801 and subsequent steps. As a result, the bit strings corresponding to the plurality of respective particles are generated.

In a case where the morpheme indicated by the morpheme ID is not a noun (step 802, NO), the generation unit 112 performs the processing in step 806 and subsequent steps. In a case where all the morpheme IDs are selected (step 806, YES), the generation unit 112 ends the processing.

According to the index generation processing in FIG. 7, the index information 321 is generated by only writing the logical value "1" in the position corresponding to the appearance position of the morpheme in the bit string corresponding to each morpheme.

In a case where the index information 321 of the document including N morphemes is generated, the size of the index information 321 corresponds to the order of N. For this reason, as compared with the index corresponding to the order of N×N representing the semantic structure of the document, the storage volume of the index information 321 may be reduced.

Figure 9:
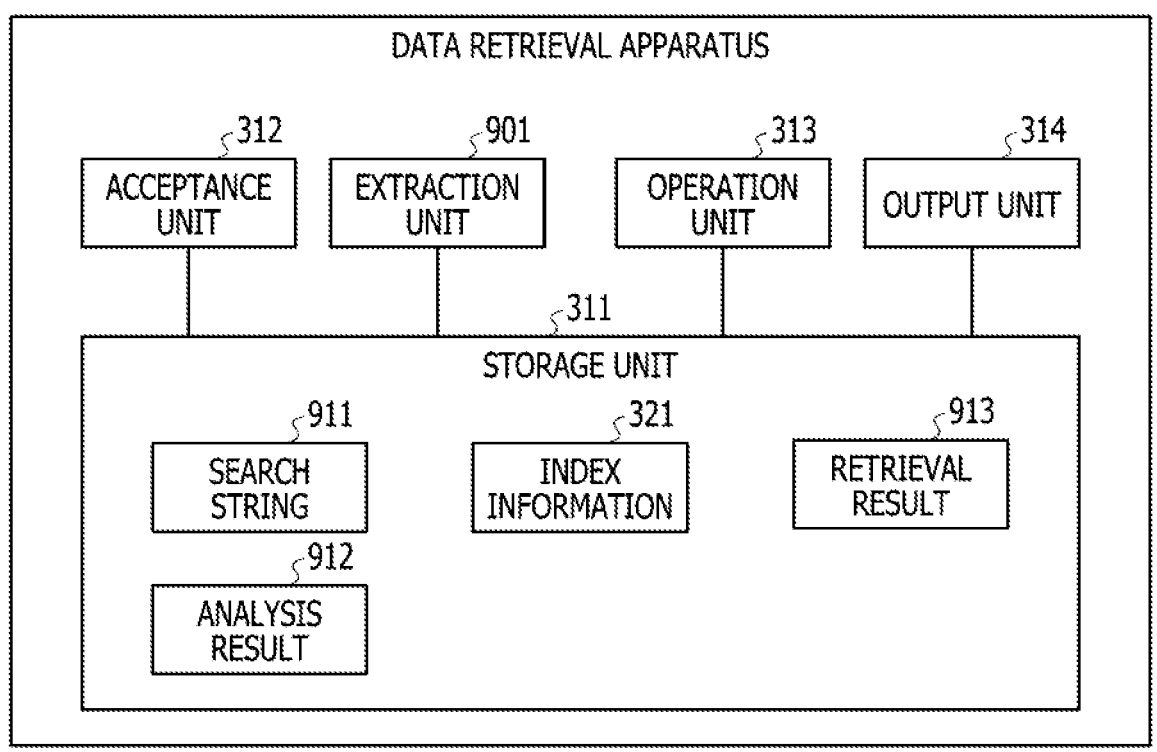
FIG. 9 is a functional configuration diagram of a specific example of the data retrieval apparatus.

FIG. 9 illustrates a specific example of the data retrieval apparatus 301 in FIG. 3. The data retrieval apparatus 301 in FIG. 9 includes the storage unit 311, the acceptance unit 312, the operation unit 313, the output unit 314, and an extraction unit 901. The storage unit 311 stores the index information 321 generated from the document information 511.

The acceptance unit 312 accepts a search string 911 with respect to the document information 511 from a user or an external apparatus and stores the search string 911 in the storage unit 311. The extraction unit 901 performs the morphological analysis on the search string 911 to extract the retrieval morphemes included in the search string 911 and generate an analysis result 912 indicating each extracted retrieval morpheme, and stores the analysis result 912 in the storage unit 311. The analysis result 912 includes the morpheme ID indicating each retrieval morpheme and the attribute information indicating the semantic attribute of the retrieval morpheme.

The operation unit 313 performs a logical operation between a plurality of bit strings included in the index information 321 by using the analysis result 912. The operation unit 313 generates a retrieval result 913 of the search string 911 based on the result of the logical operation and stores the retrieval result 913 in the storage unit 311. The output unit 314 outputs the retrieval result 913. The retrieval result 913 includes information indicating the appearance position of the search string 911 or the retrieval morpheme in the document information 511.

Figure 10:
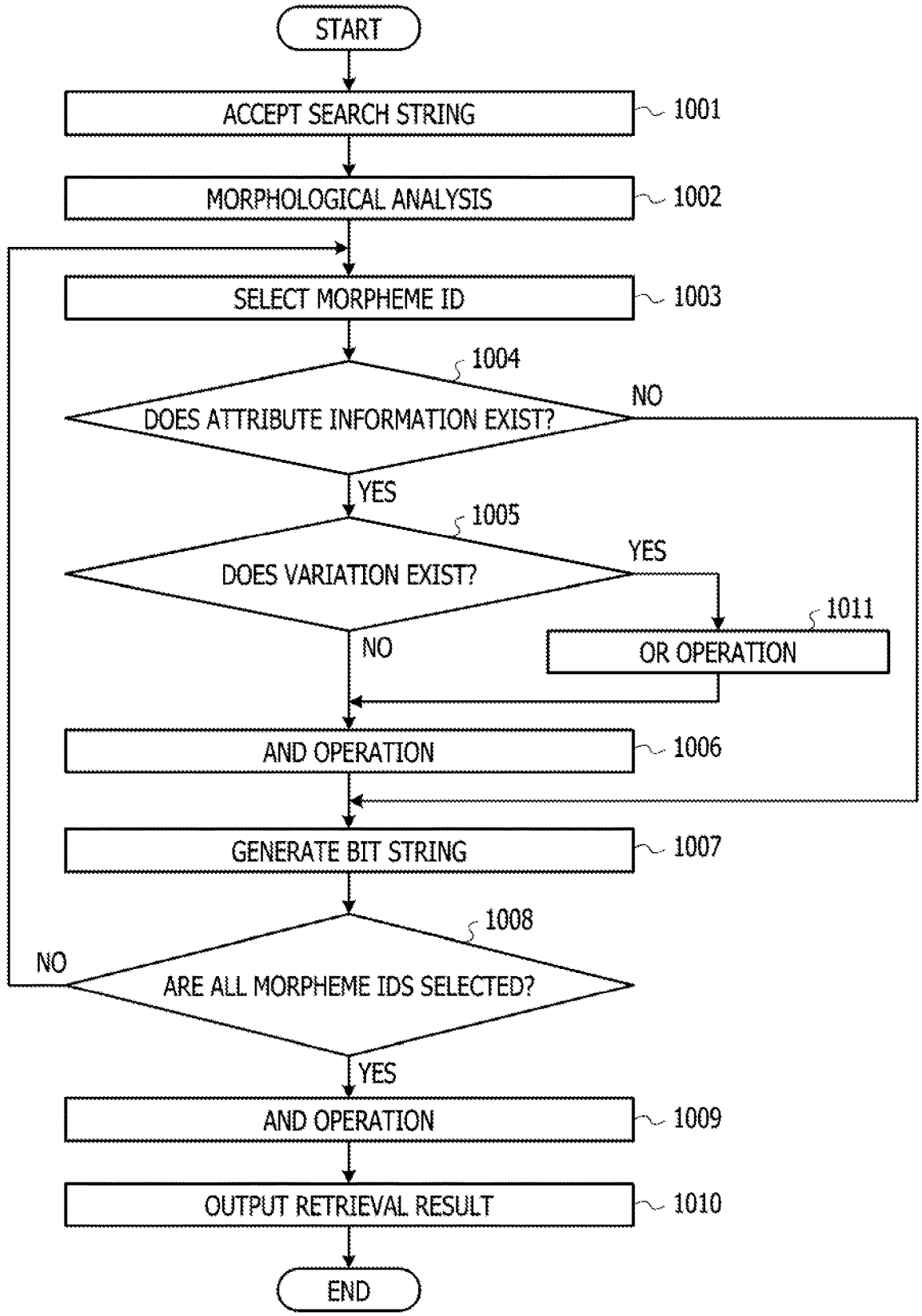
FIG. 10 is a flowchart illustrating a first specific example of the data retrieval processing.

FIG. 10 is a flowchart illustrating a first specific example of the data retrieval processing performed by the data retrieval apparatus 301 in FIG. 9. First, the acceptance unit 312 accepts the search string 911 (step 1001). The extraction unit 901 performs the morphological analysis on the search string 911 to generate the analysis result 912 (step 1002).

For example, in a case where a sentence 'Ke-ki ga reizouko ni aru.' is input to the data retrieval apparatus 301 as the search string 911, 'ke-ki', 'reizouko', and 'aru' corresponding to the morphemes other than the particle are extracted as the retrieval morphemes. The analysis result 912 including the morpheme ID indicating each retrieval morpheme is generated. In this case, the analysis result 912 includes the morpheme ID indicating 'ga' corresponding to the particle following 'ke-ki' as the attribute information of 'ke-ki' and includes the morpheme ID indicating 'ni' corresponding to the particle following 'reizouko' as the attribute information of 'reizouko'.

The search string 911 may also include information for specifying a variation of the particle following the noun in some cases. For example, in a case where the three particles 'ga', 'ha', and 'mo' are treated as the same semantic attribute of 'ke-ki', 'ha', and 'mo' are also specified as the variations of 'ga' included in the search string 911. In this case, the analysis result 912 includes the morpheme IDs indicating 'ha' and 'mo' as the variations of the attribute information of 'ke-ki'.

Then, the operation unit 313 selects one morpheme ID from the plurality of morpheme IDs included in the analysis result 912 (step 1003) and checks whether or not the attribute information of the retrieval morpheme indicated by the morpheme ID exists (step 1004).

In a case where the attribute information exists (step 1004, YES), the operation unit 313 checks whether or not the variation of the attribute information exists (step 1005). In a case where the variation of the attribute information does not exist (step 1005, NO), the operation unit 313 performs an AND operation between the bit string corresponding to the retrieval morpheme and the bit string corresponding to the attribute information to narrow down the retrieval morpheme appearance positions (step 1006). At this time, the operation unit 313 obtains a logical AND between two logical values stored in the same position of the respective bit strings and writes the obtained logical AND in the same position of another bit string to generate a bit string indicating the operation result.

In the bit string indicating the operation result, the logical value "1" indicates that the retrieval morpheme in the search string 911 exists in the document information 511. The position where the logical value "1" is stored indicates the appearance position of the retrieval morpheme in the document information 511.

On the other hand, in a case where the variation of the attribute information exists (step 1005, YES), the operation unit 313 performs an OR operation with respect to the bit strings respectively corresponding to the plural pieces of attribute information to expand a retrieval range for the retrieval morpheme (step 1011). At this time, the operation unit 313 obtains a logical OR between two logical values stored in the same position of the respective bit strings and writes the obtained logical OR in the same position of another bit string to generate a bit string indicating the operation result. The operation unit 313 performs the processing in step 1006 by using the bit string indicating the operation result as the bit string corresponding to the attribute information.

Figure 11:
FIG. 11 is a diagram illustrating an OR operation.

FIG. 11 illustrates an example of the OR operation of the bit strings corresponding to the attribute information of 'ke-ki'. This example corresponds to a case where the attribute information of 'ke-ki' included in the analysis result 912 indicates 'ga' corresponding to the particle following 'ke-ki', and 'ha' and 'mo' are included as the variations of 'ga'. In this case, the OR operation with respect to the three bit strings of 'ga', 'ha', and 'mo' included in the index information 321 in FIG. 6 is performed to generate a bit string 1101 of "'ga' or 'ha' or 'mo'".

Figure 12:
FIG. 12 is a diagram illustrating a first AND operation.

FIG. 12 illustrates an example of a first AND operation between the bit string of 'ke-ki' and the bit string of the attribute information of 'ke-ki'. The AND operation between a bit string 1201 of 'ke-ki' included in the index information 321 in FIG. 6 and the bit string 1101 in FIG. 11 is performed to generate a bit string 1202 of an AND operation result.

In the bit string 1202, the logical value "1" stored in the position represented by the number "0" in the document 1 indicates that a combination of 'ke-ki' and the following 'ga', 'ha', or 'mo' appears at the position represented by the number "0" in the document 1. The logical value "1" stored in the position represented by the number "0" in the document 2 indicates that the combination of 'ke-ki' and the following 'ga', 'ha', or 'mo' appears at the position represented by the number "0" in the document 2.

Figure 13:
FIG. 13 is a diagram illustrating a second AND operation.

FIG. 13 illustrates an example of a second AND operation between the bit string of 'reizouko' and the bit string of the attribute information of 'reizouko'. The AND operation between a bit string 1301 of 'reizouko' included in the index information 321 in FIG. 6 and a bit string 1302 of 'ni' corresponding to the attribute information of 'reizouko' is performed to generate a bit string 1303 of an AND operation result.

In the bit string 1303, the logical value "1" stored in the position represented by the number "1" in the document 2 indicates that a combination of 'reizouko' and the following 'ni' appears at the position represented by the number "1" in the document 2.

Next, the operation unit 313 uses the bit string of the AND operation result to generate a bit string indicating the document where each retrieval morpheme appears (step 1007). For example, the operation unit 313 prepares a bit string in which the total number of documents included in the document information 511 is set as a bit length and writes the logical value "1" in the position of the document corresponding to the logical value "1" of the bit string of the AND operation result to generate a bit string indicating the document where the retrieval morpheme appears.

In a case where the attribute information does not exist (step 1004, NO), the operation unit 313 performs the processing in step 1007 by using the bit string corresponding to the retrieval morpheme instead of the bit string of the AND operation result.

FIG. 14 illustrates an example of a bit string of 'aru'. A bit string 1401 of 'aru' is the same as the bit string of 'aru' included in the index information 321 in FIG. 6. Since attribute information of 'aru' does not exist, a bit string indicating the document where 'aru' appears is generated by using the bit string 1401 itself.

Next, the operation unit 313 checks whether or not all the morpheme IDs included in the analysis result 912 are selected (step 1008). In a case where the unselected morpheme ID remains (step 1008, NO), the operation unit 313 repeats the processing in step 1003 and subsequent steps. As a result, the bit string indicating the document where each retrieval morpheme included in the search string 911 appears along with the corresponding attribute information is generated.

Next, the operation unit 313 performs the AND operation with respect to the bit strings indicating the documents where the respective retrieval morphemes appear and generates a bit string indicating the document where all the retrieval morphemes appear (step 1009).

Figure 15:
FIG. 15 is a diagram illustrating a third AND operation.

FIG. 15 illustrates an example of a third AND operation with respect to the bit strings indicating the documents where the retrieval morphemes appear. A bit string 1501 indicating the document where 'ke-ki' appears is generated from the bit string 1202 of the AND operation result in FIG. 12. A bit string 1502 indicating the document where 'reizouko' appears is generated from the bit string 1303 of the AND operation result in FIG. 13. A bit string 1503 indicating the document where 'aru' appears is generated from the bit string 1401 of 'aru' in FIG. 14.

A bit string 1504 of the AND operation result is generated by the AND operation with respect to the bit strings 1501 to 1503. The logical value "1" stored in the position in the document 2 of the bit string 1504 indicates that 'ke-ki', 'reizouko', and 'aru' included in the search string 911 appear in the document 2, and each of 'ke-ki' and 'reizouko' has the corresponding attribute information.

Next, the operation unit 313 generates the retrieval result 913 based on the bit string generated in step 1009, and the output unit 314 outputs the retrieval result 913 (step 1010). The retrieval result 913 indicates the document where all the retrieval morphemes included in the search string 911 appear along with the corresponding attribute information. Therefore, the probability that the document included in the retrieval result 913 includes a sentence having a meaning similar to the search string 911 is high.

According to the data retrieval processing in FIG. 10, the retrieval morpheme included in the search string 911 and the attribute information thereof may be collectively retrieved by the logical operation between a plurality of bit strings included in the index information 321. As a result, the retrieval processing is realized in which the meaning of the search string 911 is reflected to some extent even without performing the semantic analysis.

Since collation between the document information 511 and the search string 911 is not required and the retrieval result 913 is obtained by only the logical operation with respect to the index information 321, the speed of the data retrieval processing increases.

In a case where the document information 511 is a document written in English, French, or the like, a morpheme ID indicating a preposition may be used as the attribute information of the above-mentioned (a). Since the preposition represents a semantic role of a subsequent noun to some extent, the semantically narrowing-down retrieval may be performed by using information of the preposition.

Next, the index generation processing and the data retrieval processing by using the attribute information of the above-mentioned (b) will be described. In the semantic structure obtained by the semantic analysis with respect to the document information 511, a dependency relationship represented by an arc between two nodes respectively corresponding to two morphemes may be used as the attribute information of (b), for example. The semantically narrowing-down retrieval may be performed by using the dependency relationship between the morphemes.

For example, in a case where the similar document retrieval with respect to the document information 511 including the plurality of documents is performed by using a search string 'Kare ha ke-ki ga suki da (which means that he likes a cake).', the search string is broken into six morphemes including 'kare (which means he)', 'ha', 'ke-ki (which means cake)', 'ga', 'suki (which means like)', and 'da'. In this case, the noun 'ke-ki' existing immediately before the particle 'ga' is an object of 'suki'. The pronoun 'kare' existing immediately before the particle 'ha' is an agent of 'suki'. In view of the above, it is considered to generate a search key based on these dependency relationships.

Figure 16:
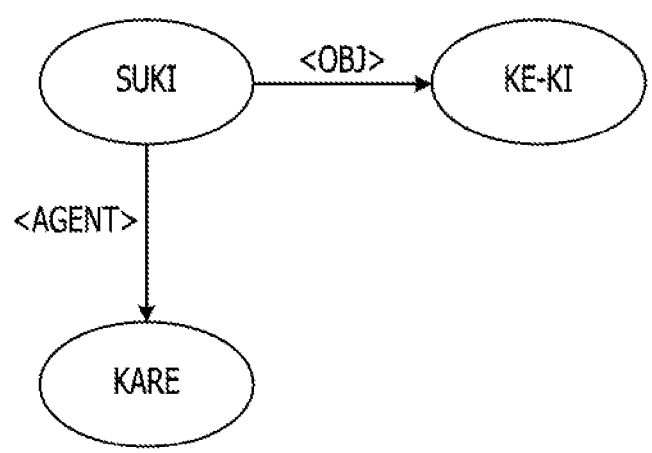
FIG. 16 is a diagram illustrating a semantic structure of a search string.

FIG. 16 illustrates an example of the semantic structure of the search string 'Kare ha ke-ki ga suki da.'. The semantic structure in FIG. 16 includes three nodes respectively corresponding to 'kare', 'ke-ki', and 'suki'.

Among those, an arc between 'suki' and 'ke-ki' represents a dependency relationship of an object (OBJ) and indicates that 'suki' is the modifier and 'ke-ki' is the head. An arc between 'suki' and 'kare' represents a dependency relationship of an agent (AGENT) and indicates that 'suki' is the modifier and 'kare' is the head. Thus, the following search condition A may be generated from the semantic structure in FIG. 16.

<Search Condition A>
Retrieval Morphemes:
'kare', 'ke-ki', and 'suki'
Semantic Information:
'ke-ki' is the head of "OBJ",
'Suki' is the modifier of "OBJ",
'Kare' is the head of "AGENT",
'Suki' is the modifier of "AGENT"

The probability that a sentence that satisfies the search condition A is a sentence having the semantic structure in FIG. 16 is significantly high. Therefore, instead of the semantic structure in FIG. 16, the search condition A may be used as the search key. The following search key is generated from the search condition A.

Search key: 'kare' AND 'ke-ki' AND 'suki' AND 'attribute of ke-ki=(head of OBJ)' AND 'attribute of suki=(modifier of OBJ)' AND 'attribute of kare=(head of AGENT)' AND 'attribute of suki=(modifier of AGENT)'

When the information about the dependency relationship between the morphemes is added to the search key as described above to perform the retrieval with respect to the document information 511, it is possible to appropriately narrow down the retrieval results.

FIG. 17 illustrates an example of the index information 321 including attribute information indicating a dependency relationship. The index information 321 in FIG. 17 is generated from the document information 511 of the document including the sentence having the same semantic structure as FIG. 16.

The morpheme/attribute information represents the morpheme ID of the morpheme included in the document and the attribute information of the morpheme. For example, 'kare', 'suki', and 'ke-ki' are morphemes, and 'OBJ modifier', 'OBJ head', 'AGENT modifier', and 'AGENT head' are attribute information.

'OBJ modifier' represents the modifier in the dependency relationship "OBJ", and 'OBJ head' represents the head in the dependency relationship. 'AGENT modifier' represents the modifier in the dependency relationship "AGENT", and 'AGENT head' represents the head in the dependency relationship.

An offset represents an appearance position of each morpheme in the document information 511. In this example, a number indicating an appearance position of the morpheme in the document is used as the offset.

The index information 321 in FIG. 17 includes the bit string corresponding to the morpheme and the bit string corresponding to the attribute information. The logical value "1" of the bit string corresponding to the morpheme indicates that the morpheme exists, and the logical value "0" indicates that the morpheme does not exist. On the other hand, the logical value "1" of the bit string corresponding to the attribute information indicates that the morpheme having the attribute information exists, and the logical value "0" indicates that the morpheme having the attribute information does not exist.

For example, in the bit string corresponding to 'OBJ modifier', the logical value "1" stored in the position represented by the number "1" indicates that the morpheme corresponding to 'OBJ modifier' appears at the position represented by the number "1" in the document. In the bit string corresponding to 'OBJ head', the logical value "1" stored in the position represented by the number "2" indicates that the morpheme corresponding to 'OBJ head' appears at the position represented by the number "2" in the document.

Figure 18:
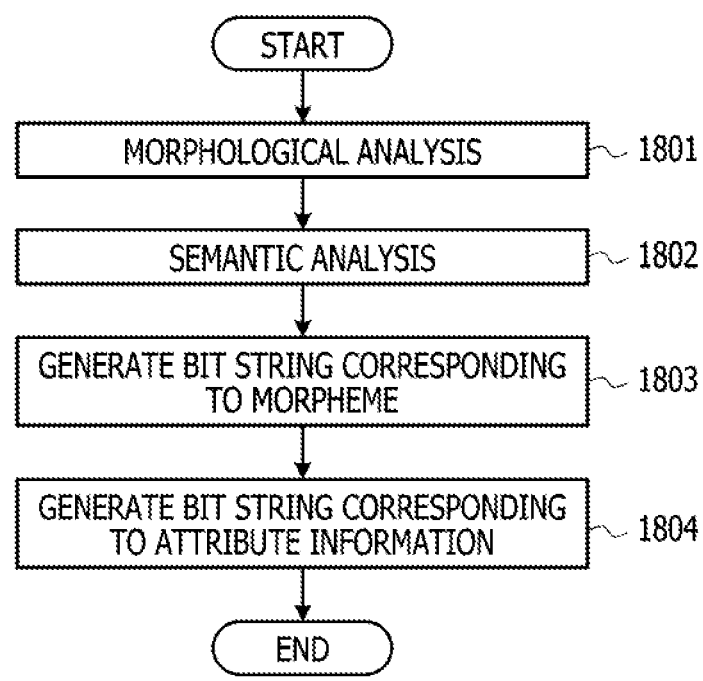
FIG. 18 is a flowchart illustrating a second specific example of the index generation processing.

FIG. 18 is a flowchart illustrating a second specific example of the index generation processing performed by the index generation apparatus 101 in FIG. 5. In this index generation processing, the index information 321 including the attribute information indicating the dependency relationship is generated.

First, the extraction unit 111 performs the morphological analysis on the document information 511 to extract the morphemes from the document information 511 (step 1801), and performs the semantic analysis (dependency analysis) on the document information 511 to obtain the semantic structure of the document information 511 (step 1802). The extraction unit 111 generates the analysis result 512 including the morpheme ID indicating each extracted morpheme and the semantic structure.

Next, the generation unit 112 generates the bit string corresponding to each morpheme based on the analysis result 512 similarly as in step 702 in FIG. 7 (step 1803). Next, the generation unit 112 generates the bit string corresponding to each attribute information based on the analysis result 512 (step 1804). At this time, the generation unit 112 writes the logical value "1" in one or more positions corresponding to the appearance position of the morpheme including the attribute information and writes the logical value "0" in the other positions in the bit string corresponding to each attribute information.

Figure 19:
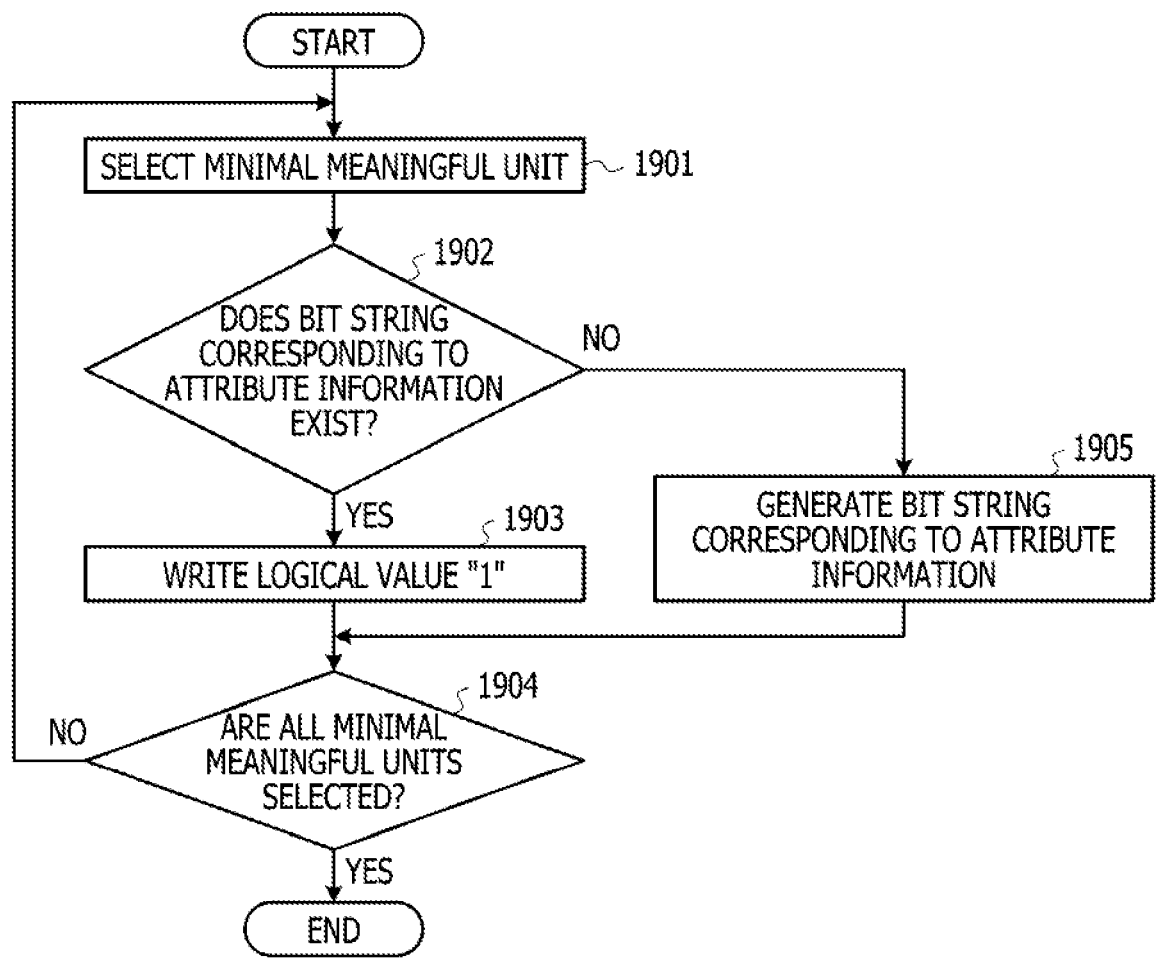
FIG. 19 is a flowchart illustrating second bit string generation processing.

FIG. 19 is a flowchart illustrating an example of second bit string generation processing in step 1804 in FIG. 18. First, the generation unit 112 selects a single minimal meaningful unit from a plurality of minimal meaningful units included in the semantic structure of the analysis result 512 (step 1901).

Next, the generation unit 112 extracts a dependency relationship represented by an arc of the minimal meaningful unit, determines the combination of the dependency relationship and the modifier as one piece of attribute information, and determines the combination of the dependency relationship and the head as the other piece of attribute information. The generation unit 112 checks whether or not the bit strings corresponding to the two pieces of attribute information exist in the index information 321 (step 1902).

In a case where the bit strings corresponding to the two pieces of attribute information exist (step 1902, YES), the generation unit 112 writes the logical value "1" in the position corresponding to the appearance position of the morpheme including the attribute information in each bit string (step 1903). On the other hand, in a case where the bit strings corresponding to the two pieces of attribute information do not exist (step 1902, NO), the generation unit 112 generates the bit strings corresponding to those pieces of attribute information (step 1905).

Next, the generation unit 112 checks whether or not all the minimal meaningful units included in the semantic structure are selected (step 1904). In a case where the unselected minimal meaningful unit remains (step 1904, NO), the generation unit 112 repeats the processing in step 1901 and subsequent steps. As a result, the bit strings respectively corresponding to the plural pieces of attribute information are generated. In a case where all the minimal meaningful units are selected (step 1904, YES), the generation unit 112 ends the processing.

According to the index generation processing in FIG. 18, the index information 321 is generated by only writing the logical value "1" in the position corresponding to the appearance position of the morpheme in the bit string corresponding to each morpheme and the bit string corresponding to each attribute information.

In a case where the index information 321 of the document including N morphemes is generated, the size of the index information 321 corresponds to the order of N. For this reason, as compared with the index corresponding to the order of N×N representing the semantic structure of the document, the storage volume of the index information 321 may be reduced.

Figure 20:
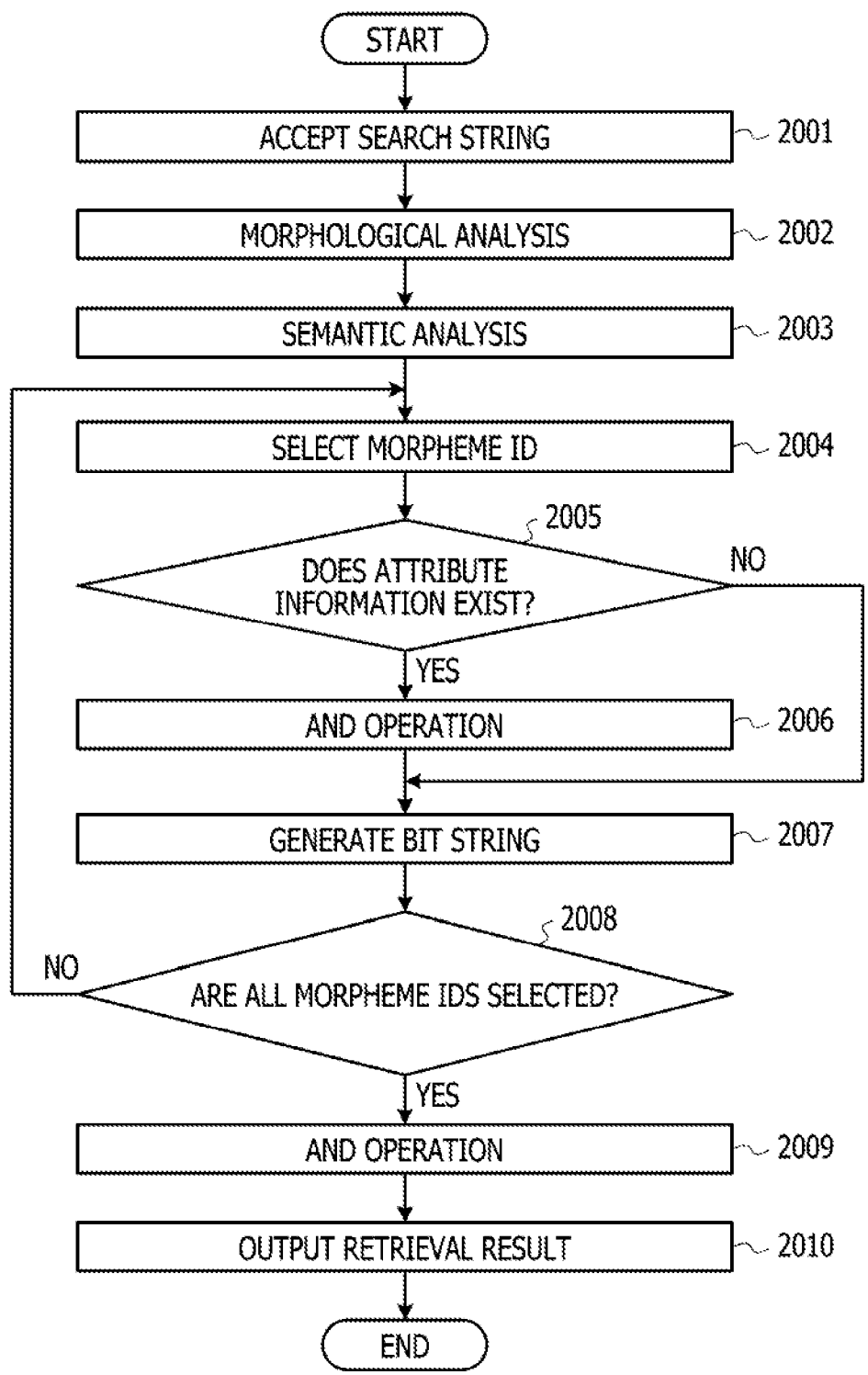
FIG. 20 is a flowchart illustrating a second specific example of the data retrieval processing.

FIG. 20 is a flowchart illustrating a second specific example of the data retrieval processing performed by the data retrieval apparatus 301 in FIG. 9. In this data retrieval processing, the search string is retrieved from the document information 511 by using the index information 321 including the attribute information indicating the dependency relationship.

First, the acceptance unit 312 accepts the search string 911 (step 2001). The extraction unit 901 performs the morphological analysis on the search string 911 to extract the retrieval morphemes from the search string 911 (step 2002), and performs the semantic analysis on the search string 911 to obtain the semantic structure of the search string 911 (step 2003). The extraction unit 901 generates the analysis result 912 including the extracted morpheme ID indicating each retrieval morpheme and the semantic structure.

For example, in a case where a sentence 'Kare ha ke-ki ga suki da.' is input to the data retrieval apparatus 301 as the search string 911, 'kare', 'ke-ki', and 'suki' are extracted as the retrieval morphemes. The analysis result 912 including the morpheme ID indicating each retrieval morpheme is generated. In this case, the analysis result 912 includes the semantic structure illustrated in FIG. 16 as the attribute information.

Next, the operation unit 313 selects one morpheme ID from the plurality of morpheme IDs included in the analysis result 912 (step 2004) and checks whether or not the attribute information of the retrieval morpheme indicated by the morpheme ID exists (step 2005).

In a case where the attribute information exists (step 2005, YES), the operation unit 313 performs an AND operation between the bit string corresponding to the retrieval morpheme and the bit string corresponding to the attribute information to narrow down the retrieval morpheme appearance positions (step 2006).

Figure 21:
FIG. 21 is a diagram illustrating a fourth AND operation.

FIG. 21 illustrates an example of a fourth AND operation between the bit string of 'kare' and the bit string of the attribute information of 'kare'. The AND operation between a bit string 2101 of 'kare' and a bit string 2102 of 'AGENT head' included in the index information 321 in FIG. 17 is performed to generate a bit string 2103 of an AND operation result. In the bit string 2103, the logical value "1" stored in the position represented by the number "0" indicates that 'kare' corresponding to 'AGENT head' appears at the position represented by the number "0" in the document.

Next, the operation unit 313 uses the bit string of the AND operation result to generate a bit string indicating the document where each retrieval morpheme appears (step 2007). For example, in a case where the document information 511 includes the plurality of documents, the operation unit 313 prepares a bit string in which the total number of documents is set as a bit length and writes the logical value "1" in the position of the document corresponding to the logical value "1" of the bit string of the AND operation result to generate a bit string indicating the document where the retrieval morpheme appears.

In a case where the attribute information does not exist (step 2005, NO), the operation unit 313 performs the processing in step 2007 by using the bit string corresponding to the retrieval morpheme instead of the bit string of the AND operation result.

Next, the operation unit 313 checks whether or not all the morpheme IDs included in the analysis result 912 are selected (step 2008). In a case where the unselected morpheme ID remains (step 2008, NO), the operation unit 313 repeats the processing in step 2004 and subsequent steps. As a result, the bit string indicating the document where each retrieval morpheme included in the search string 911 appears along with the corresponding attribute information is generated.

Figure 22:
FIG. 22 is a diagram illustrating a fifth AND operation.

FIG. 22 illustrates an example of a fifth AND operation between the bit string of 'ke-ki' and the bit string of the attribute information of 'ke-ki'. The AND operation between a bit string 2201 of 'ke-ki' and a bit string 2202 of 'OBJ head' included in the index information 321 in FIG. 17 is performed to generate a bit string 2203 of an AND operation result. In the bit string 2203, the logical value "1" stored in the position represented by the number "2" indicates that 'ke-ki' corresponding to 'OBJ head' appears at the position represented by the number "2" in the document.

Figure 23:
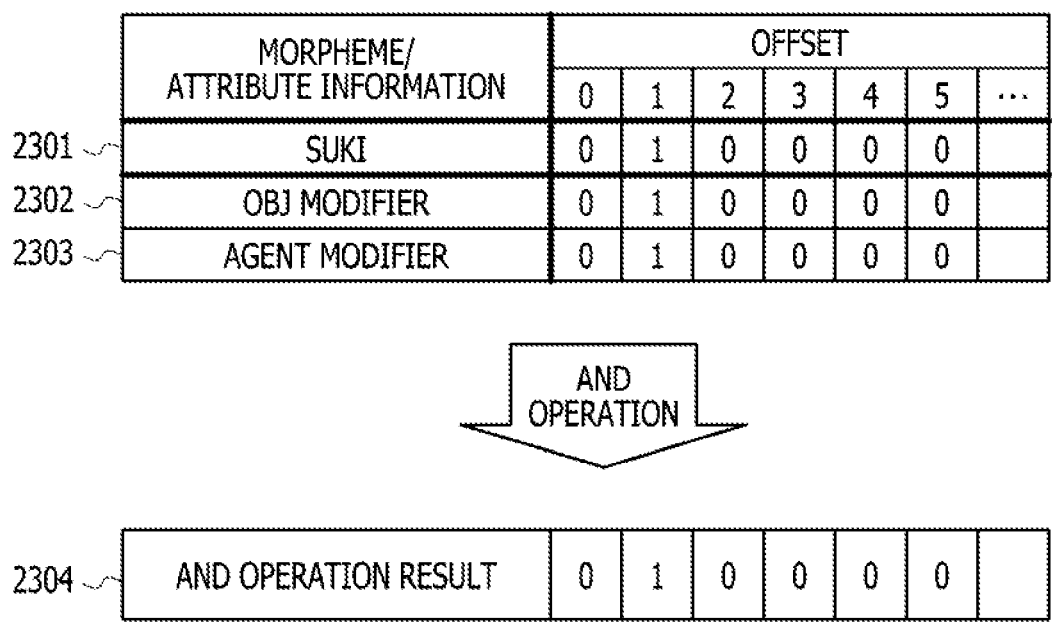
FIG. 23 is a diagram illustrating a sixth AND operation.

FIG. 23 illustrates an example of a sixth AND operation between the bit string of 'suki' and the bit string of the attribute information of 'suki'. The AND operation of a bit string 2301 of 'suki', a bit string 2302 of 'OBJ modifier', and a bit string 2303 of 'AGENT modifier' included in the index information 321 in FIG. 17 is performed to generate a bit string 2304 of an AND operation result. In the bit string 2304, the logical value "1" stored in the position represented by the number "1" indicates that 'suki' corresponding to 'OBJ modifier' and 'AGENT modifier' appears at the position represented by the number "1" in the document.

Next, the operation unit 313 performs the AND operation with respect to the bit strings indicating the documents where the respective retrieval morphemes appear and generates a bit string indicating the document where all the retrieval morphemes appear (step 2009).

FIG. 24 illustrates an example of a seventh AND operation with respect to the bit strings indicating the documents where the retrieval morphemes appear. In a case where the index information 321 in FIG. 17 is generated from the document information 511 of the plurality of documents including documents 11 to 13, the logical value "1" or the logical value "0" is stored in the position corresponding to each document in the bit string indicating the document where each retrieval morpheme appears. The bit strings illustrated in FIGS. 21 to 23 represent information of the morphemes included in the document 11.

A bit string 2401 indicating the document where 'kare' appears is generated based on the bit string 2103 of the AND operation result in FIG. 21, and the logical value "1" is stored in the position of the document 11. A bit string 2402 indicating the document where 'ke-ki' appears is generated based on the bit string 2203 of the AND operation result in FIG. 22, and the logical value "1" is stored in the position of the document 11.

A bit string 2403 indicating the document where 'suki' appears is generated based on the bit string 2304 of the AND operation result in FIG. 23, and the logical value "1" is stored in the position of the document 11. The logical value "1" is also stored in the position of the document 13 in the bit string 2403.

A bit string 2404 of the AND operation result is generated by the AND operation with respect to the bit strings 2401 to 2403. The logical value "1" stored in the position of the document 11 of the bit string 2404 indicates that 'kare', 'ke-ki', and 'suki' included in the search string 911 appear in the document 11 along with the respectively corresponding attribute information.

Next, the operation unit 313 generates the retrieval result 913 based on the bit string generated in step 2009, and the output unit 314 outputs the retrieval result 913 (step 2010).

According to the data retrieval processing in FIG. 20, similarly as in the data retrieval processing in FIG. 10, the retrieval morphemes included in the search string 911 and the attribute information thereof may be collectively retrieved. As a result, the retrieval processing in which the meaning of the search string 911 is reflected to some extent is realized without performing comparison between the mutual semantic structures.

Since collation between the document information 511 and the search string 911 is not required and the retrieval result 913 is obtained by only the logical operation with respect to the index information 321, the speed of the data retrieval processing increases.

In the index information 321 in FIG. 17, only the information indicating the dependency relationship may be used as the attribute information instead of the use of the combination of the dependency relationship and the modifier or the head as the attribute information. Only the information indicating the modifier or the head may also be used as the attribute information.

The data retrieval processing in FIG. 10 and FIG. 20 is fast. However, since the semantic structure of the document information 511 is not directly compared with the semantic structure of the search string 911, a document having a different meaning from the search string 911 may be included in the retrieval result 913 in some cases. In view of the above, verification processing for comparing the semantic structure of the document indicated by the obtained retrieval result 913 with the semantic structure of the search string 911 may be performed. When the verification processing is performed, the retrieval accuracy is further improved.

The length of each bit string is increased in proportion to the total number of morphemes included in the document information 511 in the index information 321 in FIG. 6 or FIG. 17, but the number of same morphemes appearing in the document information 511 is significantly lower than the total number of morphemes. For this reason, most of logical values included in the respective bit strings are "0", and the number of logical values "1" is lower than the number of logical values "0".

In view of the above, when addresses where the respective logical values are stored in the bit string are divided by an appropriate divisor, the bit string may be hashed. When a highest prime number among prime numbers that do not exceed a bit count of a register where the hashed bit string is stored is used as the divisor, the original bit string may also be restored from the hashed bit string. A method described in Japanese Patent Application No. 2016-083243 corresponding to an earlier application may be used as the above-mentioned hashing method, for example.

The configuration of the index generation apparatus 101 illustrated in FIGS. 1 and 5 is merely an example, and part of the components may be omitted or changed in accordance with the use or condition of the index generation apparatus 101.

The configuration of the data retrieval apparatus 301 illustrated in FIGS. 3 and 9 is merely an example, and part of the components may be omitted or changed in accordance with the use or condition of the data retrieval apparatus 301. The extraction unit 111 and the generation unit 112 may be added to the data retrieval apparatus 301 to perform the index generation processing in the data retrieval apparatus 301.

The flowcharts in FIG. 2, FIG. 4, FIG. 7, FIG. 8, FIG. 10, and FIGS. 18 to 20 are merely examples, and part of processing may be omitted or changed in accordance with the configuration or condition of the index generation apparatus 101 or the data retrieval apparatus 301.

The index information in FIG. 6 and FIG. 17, the bit strings in FIGS. 11 to 15 and FIGS. 21 to 24, and the semantic structure in FIG. 16 are merely examples. The document information and the search string change in accordance with the use of the index generation apparatus 101 or the data retrieval apparatus 301, and the index information, the operation result, and the semantic structure change in accordance with the document information and the search string. The language of the document information and the search string may be languages other than Japanese. The dependency relationship represented by the arc of the semantic structure may be a relationship other than the object and the agent.

Figure 25:
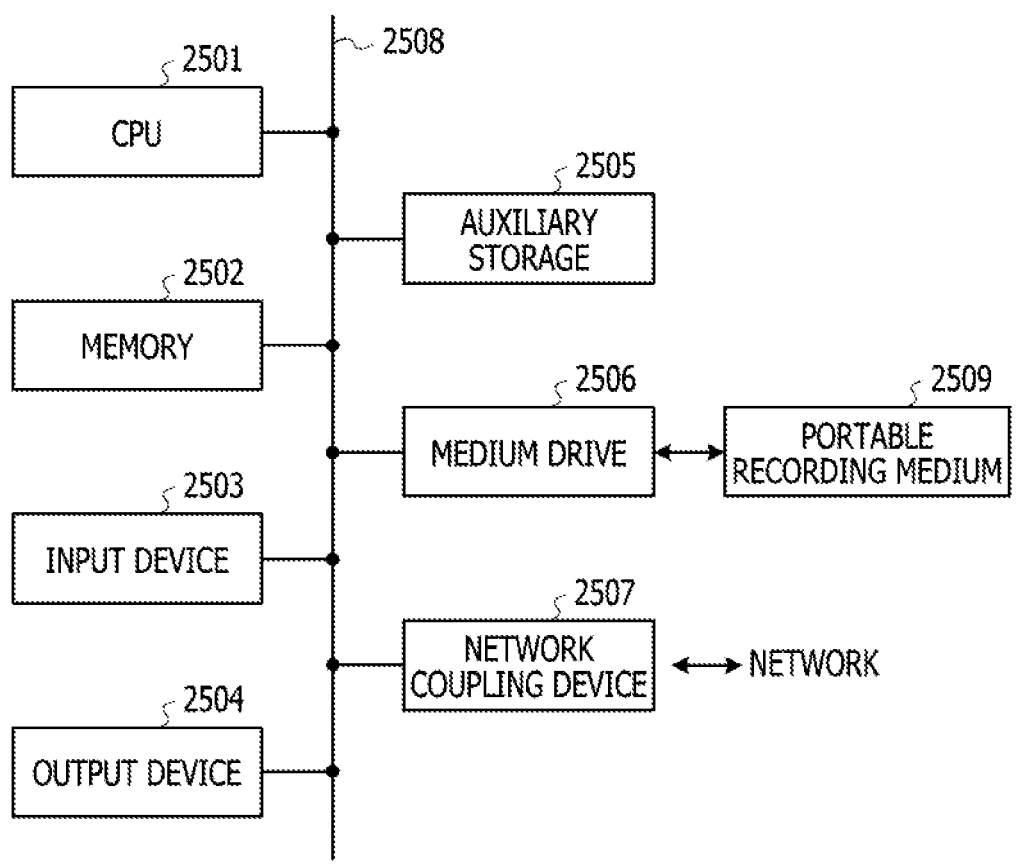
FIG. 25 is a configuration diagram of an information processing apparatus.

FIG. 25 illustrates a configuration example of an information processing apparatus (computer) used as the index generation apparatus 101 in FIG. 1 and FIG. 5 or the data retrieval apparatus 301 in FIG. 3 and FIG. 9. The information processing apparatus in FIG. 25 includes a CPU 2501, a memory 2502, an input device 2503, an output device 2504, an auxiliary storage 2505, a medium drive 2506, and a network coupling device 2507. These components are coupled to each other via a bus 2508.

The memory 2502 is, for example, a semiconductor memory such as a read only memory (ROM), a random access memory (RAM), or a flash memory, and stores programs and data to be used for processing. The memory 2502 may be used as the storage unit 311 in FIG. 3 and FIG. 9 or the storage unit 501 in FIG. 5.

In a case where the information processing apparatus is the index generation apparatus 101, the CPU 2501 (processor) executes the program by using the memory 2502, for example, and operates as the extraction unit 111 and the generation unit 112 in FIG. 1 and FIG. 5.

In a case where the information processing apparatus is the data retrieval apparatus 301, the CPU 2501 executes the program by using the memory 2502, for example, and operates as the acceptance unit 312 and the operation unit 313 in FIG. 3 and FIG. 9 and the extraction unit 901 in FIG. 9.

The input device 2503 is a keyboard, a pointing device, or the like, for instance, and is used for input of instructions and information from an operator or a user. The information to be input may be the search string 911.

The output device 2504 is, for example, a display device, a printer, a speaker, or the like, and is used to output inquiries or instructions to the operator or the user, and processing results. The output device 2504 may be used as the output unit 314 in FIG. 3 and FIG. 9. The processing result may be the retrieval result 913.

The auxiliary storage 2505 is, for example, a magnetic disk drive, an optical disk drive, a magneto-optical disk drive, a tape drive, or the like. The auxiliary storage 2505 may be a hard disk drive or a flash memory. The information processing apparatus stores the programs and data in the auxiliary storage 2505 and may use the programs and data by loading those into the memory 2502. The auxiliary storage 2505 may be used as the storage unit 311 in FIG. 3 and FIG. 9 or the storage unit 501 in FIG. 5.

The medium drive 2506 drives a portable recording medium 2509 and accesses data recorded therein. The portable recording medium 2509 is a memory device, a flexible disk, an optical disk, a magneto-optical disk, or the like. The portable recording medium 2509 may be a compact disc read only memory (CD-ROM), a digital versatile disc (DVD), a Universal Serial Bus (USB) memory, or the like. The operator or the user may store the programs and data in the portable recording medium 2509 and use the programs and data by loading those into the memory 2502.

As described above, a computer-readable recording medium in which programs and data to be used for processing are stored is a physical (non-transitory) recording medium such as the memory 2502, the auxiliary storage 2505, or the portable recording medium 2509.

The network coupling device 2507 is a communication interface that is coupled to a communication network such as a local area network or a wide area network and that carries out data conversion involved by communication. The information processing apparatus may receive the programs and the data from an external device via the network coupling device 2507 and use the programs and the data by loading those into the memory 2502.

In a case where the information processing apparatus is the index generation apparatus 101, the network coupling device 2507 may transmit the index information 321 to the data retrieval apparatus 301.

In a case where the information processing apparatus is the data retrieval apparatus 301, the network coupling device 2507 may receive the search string 911 from a user terminal and transmit the retrieval result 913 to the user terminal. In this case, the network coupling device 2507 is used as the output unit 314.

The information processing apparatus does not have to include all the components in FIG. 25, and part of the components may be omitted in accordance with the use or condition. For example, in a case where the information processing apparatus receives the search string 911 from the user terminal via a communication network, the input device 2503 and the output device 2504 may be omitted. In a case where the portable recording medium 2509 or the communication network is not used, the medium drive 2506 or the network coupling device 2507 may be omitted.

In a case where the information processing apparatus is a mobile terminal including a call function such as a smartphone, the information processing apparatus may include devices for calling such as a microphone and a speaker and also include an imaging apparatus such as a camera.

The disclosed embodiment and the advantages are described in detail, but those skilled in the art may make various changes, additions, and omissions without departing from the scope of the present disclosure clearly described in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An index generation method, comprising:
   extracting a plurality of morphemes from document information;
   generating index information, after extracting the plurality of morphemes from the document, with respect to each morpheme of the plurality of morphemes, wherein the index information includes a first logical value and a second logical value,
   the first logical value indicates existence of a first morpheme associated with morpheme information indicating the first morpheme and position information indicating a position of the first morpheme in the document information, and
   the second logical value indicates existence of the first morpheme associated with attribute information indicating a semantic attribute of the first morpheme and the position information indicating the position of the first morpheme; and
   generating a bit string corresponding to each morpheme, based on the first logical value and the second logical value included in the index information, by writing a logical value "1" in one or more positions in the bit string corresponding to the position of the morpheme including the attribute information and writing a logical value "0" in remaining positions in the bit string corresponding to each attribute information.

2. The index generation method according to claim 1, wherein the semantic attribute represents a semantic relationship between the first morpheme and another morpheme in the document information.

3. The index generation method according to claim 2, wherein the attribute information indicates a second morpheme representing the semantic relationship, the second morpheme being a morpheme existing before or after the first morpheme in the document information.

4. The index generation method according to claim 3, wherein the second morpheme is a particle.

5. The index generation method according to claim 2, wherein the attribute information includes first information and second information, the first information indicating a dependency relationship between the first morpheme and the other morpheme in a semantic structure of the document information, and the second information indicating whether the first morpheme is a modifier or a head.

6. A data retrieval method, comprising:
   accepting a search string with respect to document information;
   referring to index information, after accepting the search string with respect to the document information, with respect to each morpheme of a plurality of morphemes included in the document information, the index information including:
- a first logical value indicating existence of a morpheme which is associated with morpheme information indicating the morpheme and position information indicating a position of the morpheme in the document information, and
- a second logical value indicating existence of the morpheme which is associated with attribute information indicating a semantic attribute of the morpheme and the position information indicating the position of the morpheme;

performing a logical operation by using a third logical value associated with a retrieval morpheme included in the search string and a fourth logical value associated with a semantic attribute of the retrieval morpheme in the index information;

generating a bit string based on a result of the logical operation by writing a logical value "1" in one or more positions in the bit string corresponding to the position of the morpheme including the attribute information and writing a logical value "0" in remaining positions in the hit string corresponding to each attribute information; and outputting a retrieval result of the search string based on the bit string.

7. An apparatus of index generation, the apparatus comprising:
a memory; and
a processor coupled to the memory, the processor being configured to
extract a plurality of morphemes from document information;
generate index information, after extracting the plurality of morphemes from the document, with respect to each morpheme of the plurality of morphemes, wherein
the index information includes a first logical value and a second logical value,
the first logical value indicates existence of a first morpheme associated with morpheme information indicating the first morpheme and the position information indicating a position of the first morpheme in the document information, and
the second logical value indicates existence of the first morpheme associated with attribute information indicating a semantic attribute of the first morpheme and position information indicating the position of the first morpheme; and
generate a bit string corresponding to each morpheme, based on the first logical value and the second logical value included in the index information, by writing a logical value "1" in one or more positions in the bit string corresponding to the position of the morpheme including the attribute information and writing a logical value "0" in remaining positions in the hit string corresponding to each attribute information.

* * * * *